H. H. LOGAN.
FLEXIBLE SHAFT COUPLING.
APPLICATION FILED JULY 12, 1917.
1,272,687.
Patented July 16, 1918.
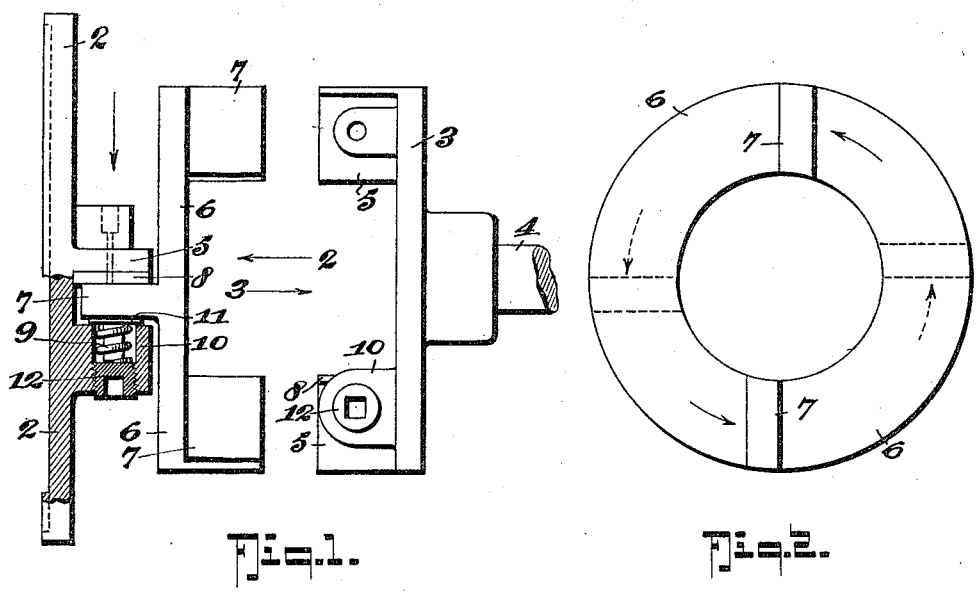
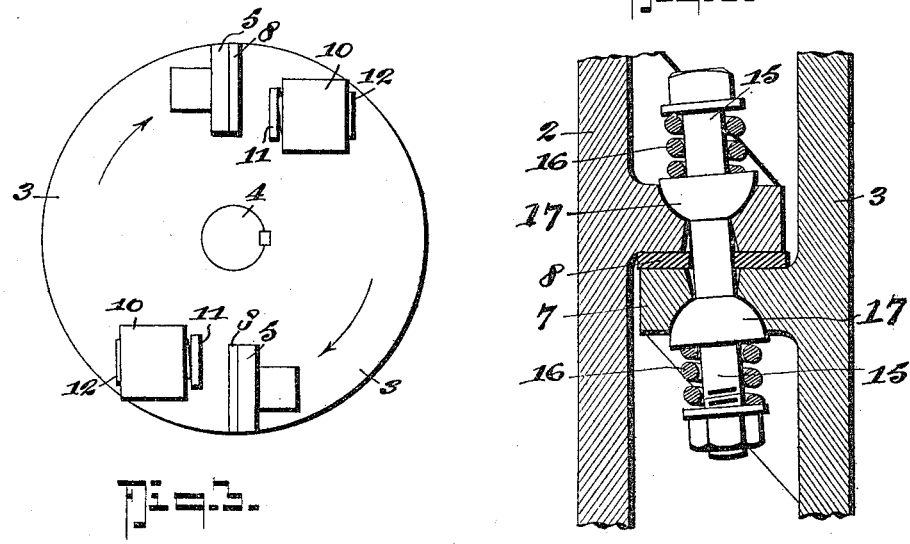
INVENTOR
H. H. Logan.
BY
Fred J. Dieterich & Co.
ATTORNEYS

UNITED STATES PATENT OFFICE.

HENRY H. LOGAN, OF VANCOUVER, BRITISH COLUMBIA, CANADA.

FLEXIBLE SHAFT-COUPLING.

1,272,687.  Specification of Letters Patent.  Patented July 16, 1918.

Application filed July 12, 1917. Serial No. 180,094.

*To all whom it may concern:*

Be it known that I, HENRY H. LOGAN, a citizen of the Dominion of Canada, residing at Vancouver, in the Province of British Columbia, Canada, have invented certain new and useful Improvements in Flexible Shaft-Couplings, of which the following is a specification.

This invention relates to a shaft or other rotational coupling which is designed to allow a limited amount of angular deviation in the alinement, and of endwise movement, of the connected shafts or other parts, and to be also free from rattle during rotation under slight variations of load.

The invention is particularly described in the following specification, reference being made to the drawings by which it is accompanied, in which:

Figure 1 is a side elevation and part section of the coupling with one of the shaft members drawn apart.

Fig. 2 is a face view of the intermediate driving flange in the direction of the arrow 2 in Fig. 1.

Fig. 3 is a face view of one of the shaft flanges of the coupling in the direction of the arrow 3 in Fig. 1, and Fig. 4 is an enlarged detail section showing a modification of the manner of holding the lugs in driving connection.

In these drawings 2 represents a flange directly or indirectly secured to one shaft or rotatable part to be rigidly rotatable with it, and 3 represents a similar flange secured on the other shaft 4. From the adjacent faces of these flanges 2 and 3 two driving lugs 5 project at right angles on diametrically opposite sides of their axis of rotation.

Between the flanges 2 and 3 is a loose or floating flange 6 from each opposite face of which project lugs 7 corresponding to the lugs 5 of the flanges 2 and 3. The driving faces of the lugs 7 of one face of the flange 6 quarter with those of the other, as shown in Fig. 2.

The construction thus far described constitutes the driving connection between the two shafts.

To avoid the rattle which intermittent engagement of the metallic driving faces of the lugs 5 and 4 would cause, a facing 8 of hard fiber or the like is secured to the driving face of each of the lugs 5 of both shaft flanges 2 and 3, and to prevent back-lash and thereby further assure the same object of noiselessness a coil spring 9 is pocketed in a chambering in a lug 10 projecting from the face of each of the shaft flanges 2 and 3 in advance of each driving lug 5, which springs act through the intervention of a bearing piece 11 upon the back of the lugs 7 of the floating flange to hold them in engagement with the driving lugs 5. The spring pocket is drilled through the lug 10 and a plug 12 is threaded in the back of the aperture by which the pressure of the spring 9 may be regulated.

The back of each lug 5 is provided with a boss drilled for the reception of a grease cup by which the driving faces of the lugs are lubricated.

With a coupling so constructed an effective driving connection is made between the two shafts and one which will allow a considerable angular variation from alinement: It will also permit of endwise movement of one shaft in relation to the other which is an essential requirement in the mechanism for which the coupling was designed. The driving faces of the flange lugs have an ample bearing surface to resist wear, and as the springs 9 hold these faces in contact under variations of speed, back-lash is avoided: In addition to which the hard fiber or rawhide liner 8 interposed between the driving faces of the lugs 5 and 7 renders them adaptable in contact and noiseless in running.

It will also be noted that the clearance between the back of the lug 7 and the adjacent face of the spring containing lug 11 is very slight so that the shafts may be reversed without imposing any severe compression on the springs.

In the modification shown in Fig. 4 the driving lugs of the floating and shaft flanges are positively connected together by bolts 15 which pass through apertures provided for them in the lugs 5 and 7, the apertures being sufficiently large to permit the limited movement of flexibility required in the coupling; and a spring 16 is interposed between the head and the nut of the bolt and a washer 17 having a spherical bearing on the edge of the aperture.

It must be noted that the rotational effort is communicated positively from one shaft to the other, as the driving lugs 5 and 7 bear directly on one another except for the intervention of the hard fiber liner 8 which has practically no yield. It does not drive through the springs as is common with flexible shaft couplings of this class. The springs merely retain the driving faces of the lugs in contact.

Having now particularly described my invention, I hereby declare that what I claim as new and desire to be protected in by Letters Patent, is:

1. Means for flexibly connecting two rotatable parts, said means comprising rigid driving lugs projecting from each of the parts toward the other, the driving faces of said lugs being in planes which are substantially radial to the axis of rotation, a loose flange between the two rotational parts, said flange having rigid lugs projecting from each face to engage those of the rotatable parts, the lugs on one side of the flange being angularly located between those of the other, said means also including back-lash-absorbing lugs adjacent to and separated from said driving lugs.

2. Means for flexibly connecting two rotatable parts, said means comprising rigid driving lugs projecting from each of the parts toward the other, the driving faces of said lugs being in planes which are substantially radial to the axis of rotation, a loose flange between the two rotational parts, said flange having rigid lugs projecting from each face to engage those of the rotatable parts, the lugs on one side of the flange being quartered with those of the other, said means also including back-lash-absorbing lugs adjacent to and separated from said driving lugs.

3. Means for flexibly connecting two rotatable parts, said means comprising rigid driving lugs projecting from each of the parts toward the other, the driving faces of said lugs being in planes which are substantially radial to the axis of rotation, a loose flange between the two rotational parts, said flange having rigid lugs projecting from each face to engage those of the rotatable parts, the lugs on one side of the flange being angularly located between those of the other, the driving faces of the lugs having a facing of indurated fiber or the like, said means also including back-lash-absorbing lugs adjacent to and separated from said driving lugs.

4. Means for flexibly connecting two rotatable parts, said means comprising lugs projecting from each of the parts toward the other, the driving faces of said lugs being in planes which are substantially radial to the axis of rotation, a loose flange between the two rotational parts, said flange having rigid lugs projecting from each face to engage those of the rotatable parts, the lugs on one side of the flange being angularly located between those of the other, and independent means adjacent to the said lugs for holding the driving faces of the several lugs resiliently in engagement.

5. Means for flexibly connecting two rotatable parts, said means comprising rigid lugs projecting from each of the parts toward the other, the driving faces of said lugs being in planes which are substantially radial to the axis of rotation, a loose flange between the two rotational parts, said flange having rigid lugs projecting from each face to engage those of the rotatable parts, the lugs on one side of the flange being angularly located between those of the other, and bolts holding each pair of lugs in driving engagement, said bolt passing through apertures in each pair of lugs, the bolt apertures in the lugs and the bearing of the head and nut of each bolt on the same being such as will permit freedom of movement of one lug on the other within the required limit.

6. Means for flexibly connecting two rotatable parts, said means comprising rigid lugs projecting from each of the parts toward the other, the driving faces of said lugs being in planes which are substantially radial to the axis of rotation, a loose flange between the two rotational parts, said flange having rigid lugs projecting from each face to engage those of the rotatable parts, the lugs on one side of the flange being angularly located between those of the other, springs holding the lugs of the floating flange in contact with those of the rotatable parts, there being one spring for each lug and means for limiting backward movement of the lugs of the floating flange against the springs.

7. Means for flexibly connecting two rotatable parts, said means comprising rigid lugs projecting from each of the parts toward the other, the driving faces of said lugs being in planes which are substantially radial to the axis of rotation, a loose flange between the two rotational parts, said flange having rigid lugs projecting from each face to engage those of the rotatable parts, the lugs on one side of the flange being angularly located between those of the other, springs holding the lugs of the floating flange in contact with those of the rotatable parts, means for adjusting said springs, and means for limiting backward movement of the lugs of the floating flange against the springs.

In testimony whereof I affix my signature.

HENRY H. LOGAN.

Copies of this patent may be obtained for five cents each, by addressing the "Commissioner of Patents, Washington, D. C."